July 28, 1964  D. S. OLIVER  3,142,260

PUMP SEAL

Filed Oct. 9, 1961

Inventor:
Delbert S. Oliver
By: John W Butcher
Atty.

United States Patent Office 3,142,260
Patented July 28, 1964

3,142,260
PUMP SEAL
Delbert S. Oliver, Wooster, Ohio, assignor to Borg-Warner Corporation, Chicago, Ill., a corporation of Illinois
Filed Oct. 9, 1961, Ser. No. 143,674
4 Claims. (Cl. 103—126)

This invention relates to a seal assembly and more particularly to a seal for use in a gear pump of the type wherein pressure loaded springs are utilized.

A conventional pump with pressure loaded bearings normally includes a seal member positioned between the end cover and the housing of a gear pump. This seal member normally includes a portion which extends between the end cover and the axially shiftable bearings to define at least two separate chambers between the end cover and the bearing members. See for example U.S. Patent 2,990,783, D. S. Oliver, entitled "Gear Pumps," issued on July 4, 1961. Seals heretofore employed generally included a resilient member such as, for example, an O ring for the portion of the seal member which extends between the end cover and the housing as well as for the portion of the seal member which extends between the end cover and the bearings.

The combination of a pressure differential across the seal along with the movement of the bearing with respect to the end cover results in considerable wear of the portion of the seal member which extends between the end cover and the axially shiftable bearings. It is believed the wear can be attributed, at least in part, to the fact that fluid acting against the seal tends to lift the seal out of its groove and tends to force the seal into the space between the bearing and the end cover. Then as the bearing shifts toward the end cover the seal is trapped and is pinched between the end cover and the bearing.

Briefly described this invention relates to the use of a thin metallic member having a first side adapted to engage a surface of the end cover and a second side adapted to engage an end surface of the journal bearing to provide a barrier to the flow of fluid therebetween. A resilient member is used to force the metallic member into initial engagement with the end cover and the end surface of the journal bearing. A fluid pressure differential across the metallic member maintains the metallic member in engagement with the end cover and the end surface of the journal bearing.

Other objects, advantages and novel features of the invention will become apparent upon consideration of the detailed description taken in connection with the accompanying drawings wherein.

Figure 1:
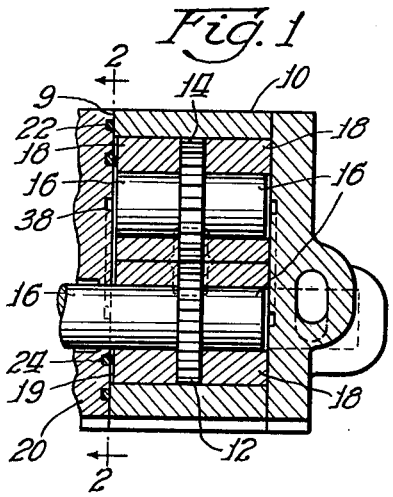
FIGURE 1 is a view partially in cross section of a gear pump of the type wherein pressure loaded bearings are utilized.
Figure 2:
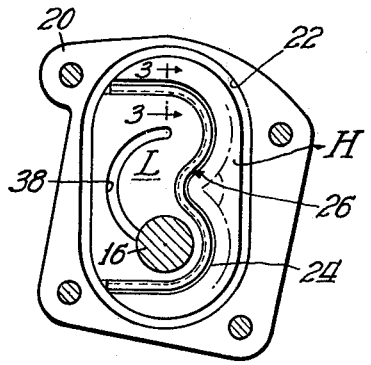
FIGURE 2 is a view partially in cross section taken along section lines 2—2 of FIGURE 1.
Figure 4:
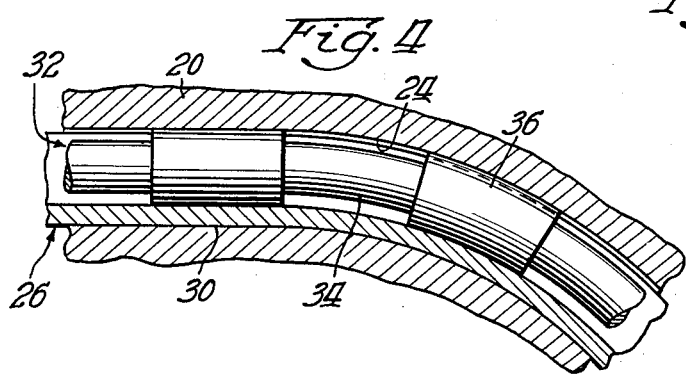
FIGURE 4 is an enlarged partial view partially in cross section taken along section lines 4—4 of FIGURE 3.
Figure 3:
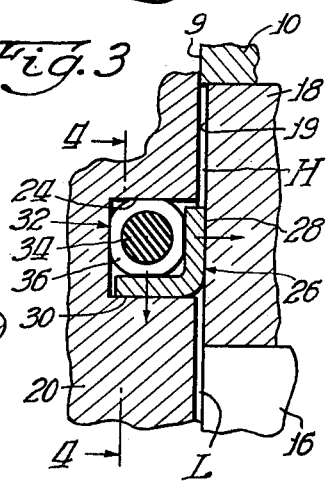
FIGURE 3 is a partial view partially in cross section taken along sections line 3—3 of FIGURE 2.

With reference to the drawings and more particularly to FIGURE 1 the gear pump of the present invention comprises a housing 10 having formed therein a plurality of substantially cylindrical parallel bores. Gears 12 and 14 are disposed within the cylindrical bores of the housing 10. Journals 16 are provided for gears 12 and 14. These journals extend within journal bearings 18. An end cover 20 part of the housing 10 is secured to the housing 10 and series to retain the journals 16 and the gears within the housing 10.

A first groove 22 of generally oval configuration is formed in the end cover 20 such that it encircles the cylindrical bores and such that it mates with the end face 9 of the housing 10. Thus a seal member positioned within the groove 22, the contact with the end cover 20 and the end face 9 of the housing 10 is effective to prevent leakage of fluid from the cylindrical bores of the housing 10. It will be understood by those skilled in the art that this groove 22 may be formed in the end cover 20, the end face 9 of the housing 10, or formed in part within the end cover 20 and in part within the end face 9 of the housing 10.

A second groove 24 is formed within the end cover 20 such that it extends within the confines of the area encompassed by the first groove 22. The purpose of the second groove and its associated seal member is to form a high pressure cavity H and a low pressure cavity L between the end cover 20 and the end surface 19 of the journal bearing 18. It will be understood, by those skilled in the art that the second groove 24 may be formed in the cover, in the end surface of the journal bearings or in both the cover and the end surface of the journal bearings.

Figure 5:
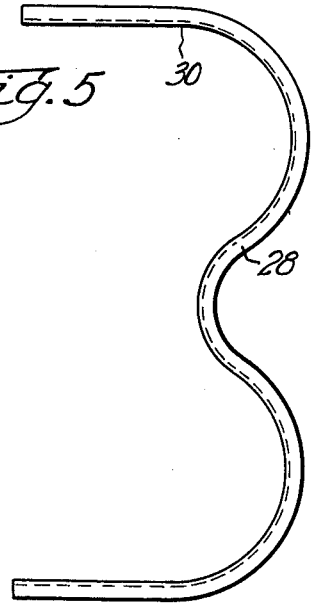
FIGURE 5 is a top view of the metallic member portion of the seal.
Figure 6:
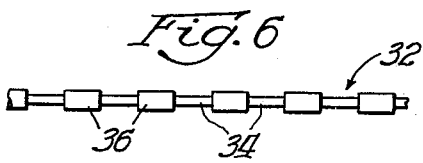
FIGURE 6 is a view of the resilient member part of the seal member.

The seal member of the present invention includes a thin metallic member 26 (FIGURE 5) having a first surface 28 adapted to engage a surface of the journal bearing 18 and a second surface 30 adapted to engage a surface of the end cover 20. This thin metallic member is held in position by a resilient member 32 (FIGURE 6). Resilient member 32 is preferably an elastomer of a cylindrical configuration. A particularly preferred configuration of the resilient member is one having a cylindrical body portion 34 with a plurality of lands 36 spaced axially therealong.

In operation fluid under pump discharge pressure is transmitted to the high pressure cavity H between the end cover and the end surface of the journal bearing which cavity is encompassed by the sealing member in first groove 22 and the sealing member in second groove 24. Fluid under high pressure acts against the thin metallic member 26 such that the first surface 28 is forced against the end surface 19 of the journal bearing 18 and the second surface 30 is forced against a wall of the groove 24 in the end cover 20 thus providing a barrier to the flow of fluid from the high pressure cavity H to the low pressure cavity L.

During the operation of gear pumps of this type, it is inevitable that at least a small quantity of the fluid being pumped will leak between the side faces of the displacing gears and the inner end faces of the journal bearings and from there through the journal bearings to the outer extremities of the gear journals. This is not an undesirable situation in that it provides the requisite lubrication for the journal bearings and journals and thus prevents seizing thereof. However, some provision must be made to remove this fluid once it has exited from the journal bearings. To this end the end cover 20 is provided with an arcuate groove 38 which provides fluid communication between the outer extremities of the gear journals and journal bearings, and the passages defined by the arcuate indentations and the adjacent portions of the outer walls of the journal bearings. The leakage fluid may thus flow through the passage and then return to the inlet side of the pump.

It is to be understood that the above described embodiment of the invention is merely intended to be illustrative of the principal features of the invention. Numerous other arrangements and modification may be readily devised by those skilled in the art to achieve a similar apparatus which will still be encompassed by the spirit and scope of the present invention.

I claim:

1. A hydraulic apparatus comprising: a housing having a cavity and a pair of end walls, including an end cover closing off said cavity; rotatable means having sides thereon disposed in said cavity; means defining an inlet and an outlet in said housing leading respectively to and from said rotatable means whereby said rotatable means receives fluid from said inlet and delivers the same out said outlet; axially movable journal bearing means disposed in said cavity rotatably supporting said rotatable means; a thin metallic member of a generally right angular cross-sectional configuration having a first surface in engagement with said journal bearing and having a second surface in engagement with said housing, and a resilient member acting against said first surface to maintain said first surface engagement with said journal bearing and acting against said second surface to maintain said second surface in engagement with said housing such that said thin metallic member forms a seal between said housing and said journal bearing and defines a pressure cavity between said housing and said journal bearing in communication with said outlet whereby fluid in said pressure cavity maintains said axially movable journal bearing in engagement with said rotatable means.

2. A hydraulic apparatus comprising: a housing having a cavity and a pair of end walls, including an end cover closing off said cavity; rotatable means having sides thereon disposed in said cavity; means defining an inlet and an outlet in said housing leading respectively to and from said rotatable means whereby said rotatable means receives fluid from said inlet and delivers said fluid out said outlet; axially movable journal bearing means disposed in said cavity and rotatably supporting said rotatable means; a groove in said end cover, a thin metallic member of generally right angular cross sectional configuration having a first surface in engagement with said journal bearing and having a second surface in engagement with a side of said groove, said thin metallic member being particularly characterized as being responsive to a differential pressure of fluid thereacross such that said first surface will remain in engagement with said journal bearing and said second surface will remain in engagement with said side of said groove, and means including a resilient member interposed between said first surface and said groove to provide for initial engagement of said first surface with said journal bearing and interposed between said second surface and said groove to provide for initial engagement of said second surface with said side of said groove.

3. A hydraulic apparatus comprising: a housing having a cavity and a pair of end walls, including an end cover closing off said cavity; rotatable means having sides thereon disposed in said cavity; means defining an inlet and an outlet in said housing leading respectively to and from said rotatable means whereby said rotatable means receives fluid from said inlet and delivers the same out said outlet; axially movable journal bearing means disposed in said cavity rotatably supporting said rotatable means; a groove in said end cover, a thin metallic member of right angular cross sectional configuration having a first surface in engagement with said journal bearing and having a second surface in engagement with a side of said groove, and an elastomer of a cylindrical configuration positioned in said groove in engagement with said first surface and in engagement with said second surface effective to urge said first surface against said journal bearing and effective to urge said second surface against said side of said groove.

4. A hydraulic apparatus comprising: a housing having a cavity and a pair of end walls, including an end cover closing off said cavity; rotatable means having sides thereon disposed in said cavity; means defining an inlet and an outlet in said housing leading respectively to and from said rotatable means whereby said rotatable means receives fluid from said inlet and delivers the same out said outlet; axially movable journal bearing means disposed in said cavity rotatably supporting said rotatable means; a groove in one of said end walls, a thin metallic member of right angular cross sectional configuration having a first surface in engagement with said journal bearing and having a second surface in engagement with said housing, and an elastomer of a cylindrical configuration having axially spaced lands provided thereon positioned in said groove compressed between said thin metallic member and said groove effective to permit fluid to pass between adjacent lands and act against said first surface and said second surface to maintain said first surface against said journal bearing and to maintain said second surface against said housing.

References Cited in the file of this patent

UNITED STATES PATENTS

| | | |
|---|---|---|
| 2,044,873 | Beust | June 23, 1936 |
| 2,742,862 | Banker | Apr. 24, 1956 |
| 2,781,730 | Newmier | Feb. 19, 1957 |
| 2,793,595 | Lauck | May 28, 1957 |
| 2,809,592 | Miller et al. | Oct. 15, 1957 |
| 2,824,522 | Compton | Feb. 25, 1958 |
| 2,824,524 | Banker | Feb. 25, 1958 |
| 2,993,450 | Weigert | July 25, 1961 |
| 2,996,015 | Prasse | Aug. 15, 1961 |
| 2,996,998 | Gold et al. | Aug. 22, 1961 |
| 3,011,448 | Oliver | Dec. 5, 1961 |
| 3,050,010 | Thrap et al. | Oct. 21, 1962 |
| 3,067,687 | Husney | Dec. 11, 1962 |
| 3,068,804 | Thrap et al. | Dec. 18, 1962 |